(No Model.)
E. E. FLORA.
MAGAZINE CAMERA.
No. 589,346. Patented Aug. 31, 1897.
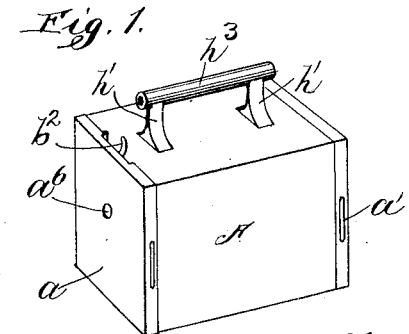
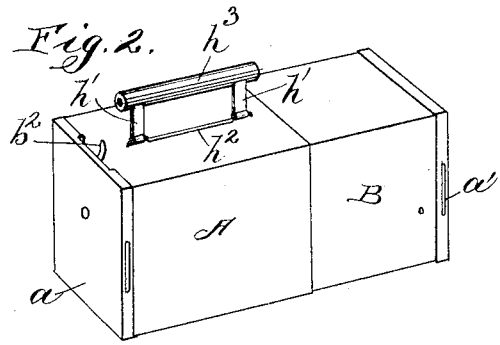
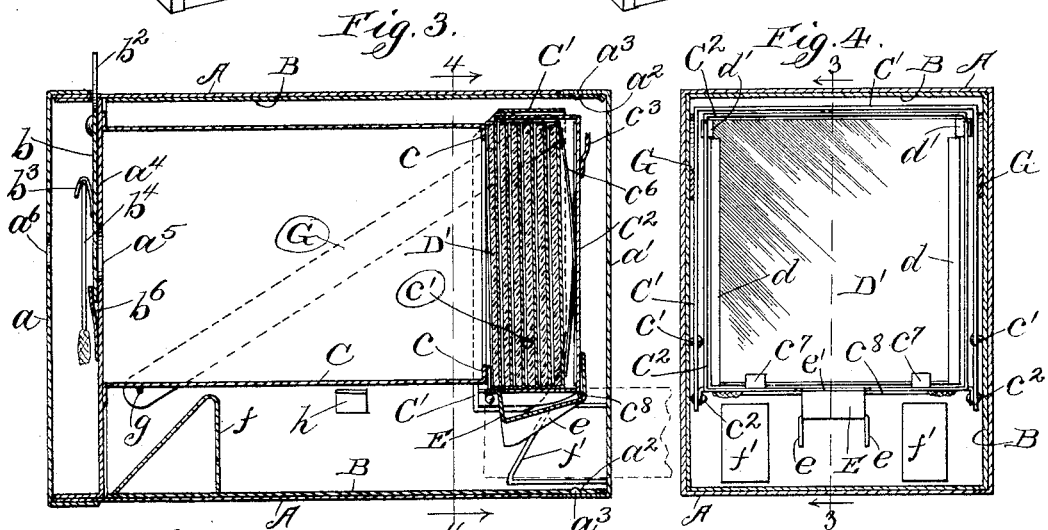
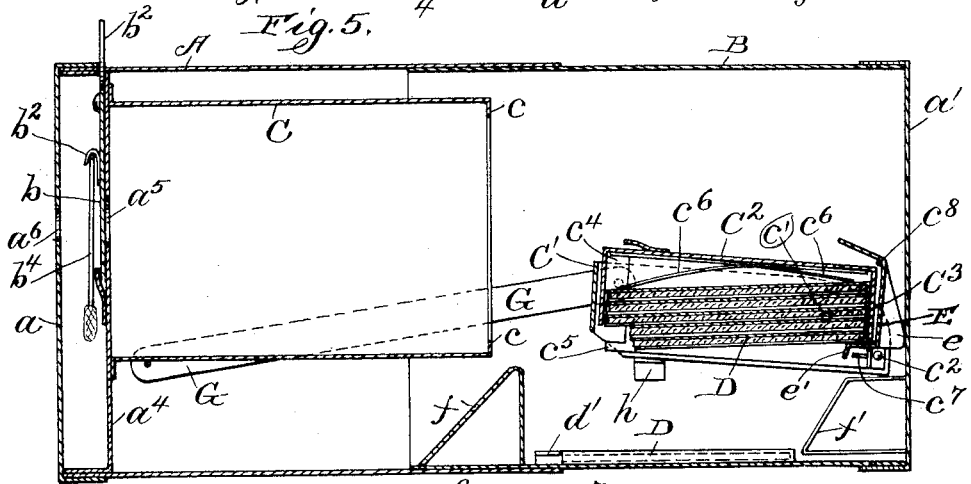
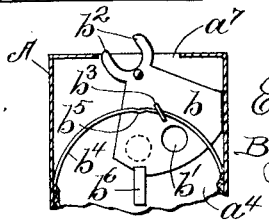
Witnesses:
R. J. Jacker.
E. A. Duggan.
Inventor:
Ellsworth E. Flora
By Chas. C. Tillman
Atty.
THE NORRIS PETERS CO., PHOTO-LITHO., WASHINGTON, D. C.

UNITED STATES PATENT OFFICE.

ELLSWORTH E. FLORA, OF CHICAGO, ILLINOIS.

MAGAZINE-CAMERA.

SPECIFICATION forming part of Letters Patent No. 589,346, dated August 31, 1897.

Application filed April 7, 1897. Serial No. 631,049. (No model.)

*To all whom it may concern:*

Be it known that I, ELLSWORTH E. FLORA, a citizen of the United States, residing at Chicago, in the county of Cook and State of Illinois, have invented certain new and useful Improvements in Cameras, of which the following is a specification.

This invention relates to improvements in photographic cameras, and is more especially applicable to that class of such instruments known as "hand" cameras of the magazine type; and it consists in certain pecularities of the construction, novel arrangement, and operation of the various parts or elements thereof, as will be hereinafter more fully set forth and specifically claimed.

The principal objects of my invention are to provide a light, portable, and compact camera in which a plate-carrier and a mechanism to operate the same are located, whereby a number of sensitized plates or films may be successively brought or placed into the focal plane or into position for exposure to the light, when desired, by the inward movement of one of the telescopic sections comprising the casing and successively released from the carrier and deposited by the withdrawal or outward movement of said section; to furnish a construction by means of which the plates after they have been placed in the carrier may be manipulated without opening the casing or without the employment of exterior or protruding devices, such as levers, thumb-buttons, or screws and the like.

Another object of my invention is to afford a camera comprising a mechanism to perform the above-named operations, the parts of which to a great extent, when so desired, may be stamped out of sheet material, thereby not only reducing the weight and size but materially simplifying and cheapening the construction.

Other objects and advantages will appear in the following description.

In order to enable others skilled in the art to which my invention pertains to make and use the same, I will now proceed to describe it, referring to the accompanying drawings, in which—

Figure 1 is a perspective view of the camera, showing it in its compact and portable form or its parts in their retracted positions. Fig. 2 is a similar view illustrating the sections composing the casing in their extended positions. Fig. 3 is an enlarged longitudinal sectional view of the camera, taken on line 3 3 of Fig. 4, showing the parts in the position they will occupy when ready for an exposure. Fig. 4 is a cross-sectional view taken on line 4 4 of Fig. 3. Fig. 5 is a central longitudinal sectional view showing the sections of the casing and the parts of the camera in their extended positions; and Fig. 6 is a detail vertical sectional view, partly in elevation, showing the front part of the casing and the spring-actuated shutter.

Similar letters refer to like parts throughout the different views of the drawings.

A represents the outer casing of the camera, and consists of a rectangular box open at one of its ends to receive the inner casing B, which two portions are adapted to telescope one within the other and are preferably made of sheet metal, each having at its outer end a removable cap $a$ and $a'$ of similar material, which are preferably secured on their respective casings by means of depressions $a^2$ and corresponding protuberances $a^3$, formed by means of a suitable punch or other instrument.

In the front portion of the casing A is vertically located a partition $a^4$, which is provided with an opening $a^5$ for the reception and retention of a suitable lens. (Not shown.) On the front or outer surface of the partition $a^4$ is pivotally secured a shutter $b$, which is provided with an opening $b'$, adapted to register, when desired, with the openings $a^5$ and $a^6$ in the said partition and cap $a$, respectively. As is clearly shown in Figs. 3 and 5 of the drawings, the partition $a^4$ is located some distance from the cap $a$ on the front end of the section A of the casing to allow of the free movement of the shutter $b$, whose upper portion is provided with arms $b^2$, which extend through a suitable slot $a^7$ in the top of the section A or outer casing and by means of which arms the shutter may be operated. The outer or front surface of the shutter is provided with a hook or eyelet $b^3$, through which is passed a spring $b^4$, having its ends secured to the sides of the casing. The middle of this spring is preferably formed with a slight depression $b^5$ to hold the opening $b'$ in the shutter in alinement with the openings $a^5$ and $a^6$ when an exposure is desired. Secured to the partition $a^4$ just below the lower part of the shutter is a strip $b^6$, having its upper portion free and bent outwardly to allow the shutter to pass between said portion and the partition. Secured to the inner or rear surface of the partition $a^4$ is a rectangular dark box C, which has its rear end open and the perimeter of said end preferably formed with internal flanges $c$ to closely fit within the rectangular frame C', composing a part of the magazine or plate-carrier, and against the flanges $d$ of the plate-holders, thereby forming a light-tight connection or contact.

The magazine or plate-carrier comprises the frame C', which consists of three sides of a rectangular figure and is pivotally secured by means of pins or rivets $c'$ near its open end to the inner casing B, and a box $C^2$, which is pivotally secured at its lower end by means of pins or rivets $c^2$ to the lower or open end of the frame C' and is adapted to fit snugly and be retained within said casing by reason of frictional contact therewith. The rear outer surface of the box $C^2$ is provided near its upper end with a projection $c^3$ for the convenience of removing the box from the frame C' when desired to insert the plate-holders. The front portion of the box $C^2$ or that portion thereof adjacent to the box C is open and its sides are formed in their upper parts with slots $c^4$ and upwardly-extending projections $c^5$ to receive and engage, respectively, the lateral projections $d'$ on the plate-holders D, which holders are made of rectangular pieces of sheet material and have three of their edges bent to form flanges $d$ to receive the sensitized plates D'. Secured to the inner rear surface of the box $C^2$ are a number of springs $c^6$, which have a tendency to press the plate-holders D forwardly through the open portion of said box.

The lower end of the box $C^2$ is provided with inwardly-projecting lugs $c^7$, located thereon near the sides and edge of the opening in the box and prevent at said end the outward displacement of the plate-holders, which would otherwise be caused by reason of the pressure of the springs $c^6$ thereagainst. The lower end $C^3$ of the box $C^2$ has secured thereto, by means of a torsion-spring $c^8$, a discharger or releaser E for the plate-holders, which is substantially rectangular in cross-section and has one or more rearwardly-extending flanges $e$ to contact with the cap $a'$ or end piece of the inner casing B for the purpose as will be presently explained.

The lower or inner portion of the discharger E is provided with an arm $e'$, which extends inwardly and about at a right angle to the body of the discharger through a slot or opening in the lower edge of the lower end piece $C^3$ of the box $C^2$, which contains the plate-holders.

The lower surface of the inner casing B is formed or provided internally, near its inner end, with projections $f$ to prevent the plate-holders, after they have been released from the carrier, sliding forward, and the cap $a'$ is also provided on its inner surface with similar projections $f'$ to guide the plate-holders forward as they drop from the carrier. On each side of the frame C' and near its upper portion is pivotally secured one end of a lever G, whose other end is likewise secured on a pin $g$, located in the front part of the outer casing. Each of the sides of the inner casing or section B is formed or provided internally with a bracket $h$, on which the sides of the frame C' may rest when the casings are in their extended positions.

In Figs. 1 and 2 of the drawings I have shown the outer casing A provided with a combined finder and handle, which consists of a tube $h^3$, which may be rigidly secured on the casing by means of standards $h'$, as shown in Fig. 1 of the drawings, or said standards may be secured to the casing by means of a hinge $h^2$, as shown in Fig. 2, in which latter construction it is evident that the finder may be turned on its hinge to lie closely against the casing.

The operation is as follows: The cap or end piece $a'$ of the casing B may be removed while the casing is in its contracted position, as shown in Fig. 3 of the drawings, when the plate-carrier will be in a vertical position, as shown in said figure. The box or magazine $C^2$ may then be turned outwardly on its pivots $c^2$ on the frame C' and the plate-holders placed and secured therein by pressing down the springs $c^6$ and forcing the forward ends of the holders under the lugs $c^7$ and the arms or projections $d'$ of the plate-holders under the projections $c^5$ of the plate-holding box. When a sufficient number of the plate-holders shall have thus been placed within the box, it may be returned to its vertical position within the frame C' and there held by frictional contact or otherwise. By withdrawing or extending the casing B to the position shown in Fig. 2 of the drawings the frame C', carrying the box or magazine $C^2$, will be tilted or turned on its pivots $c'$ by reason of the levers G, connected to its upper end, in which operation the flanges $e$ of the discharger or releaser E will impinge the cap $a'$ of the inner casing B, which will force the projection $e'$ of the discharger or releaser against the end of the lower plate-holder and cause it to be moved forwardly until the projections or arms $d'$ on its front end will be released from the projections $c^5$ of the box, thus causing the plate-holder to be deposited in the bottom of the inner casing. By again pushing in the inner casing the plate-carrier will be raised to a vertical position at the inner end of the box C, ready for another exposure, which may be made by turning the shutter $b$ so that its arms $b^2$ will assume a vertical position, that the opening $b'$ therein may be brought into alinement with the openings $a^5$ and $a^6$.

It is apparent that by forming the spring $b^4$, which actuates the shutter, with a slight depression $b^5$ at its middle the shutter will be held, by reason of the hook $b^3$, in the proper position for an exposure, when it can be released therefrom by pressing on the arms $b^2$ in either direction, when the spring will act to firmly hold it so as to shut out the light.

Having thus fully described my invention, what I claim as new, and desire to secure by Letters Patent, is—

1. The combination in a camera, of the telescoping sections forming the casing, with a plate-carrier or magazine pivotally secured in one of the sections, and a mechanism to raise the carrier or magazine to a vertical position by the inward movement of the sections and to lower it to a horizontal position and release one of the plate-holders by the extension of said sections, substantially as described.

2. The combination in a camera, of the telescoping sections forming the casing, with a box fixed in one of said sections and having its rear end open, a plate-carrier or magazine pivotally secured in the other section, and a mechanism to raise the carrier or magazine to a vertical position at the open end of the fixed box by the inward movement of the sections and to lower it to a horizontal position and release one of the plate-holders by the extension of said sections, substantially as described.

3. The combination in a camera, of the telescoping sections forming the casing, one of the sections having a removable cap, or end plate, with the frame $C'$, pivotally secured in said section near its end plate, the box or magazine $C^2$, pivotally secured in said frame and adapted to engage therewith, and a mechanism to raise the frame and box to a vertical position by the inward movement of the sections and to lower it to a horizontal position by the extension of the sections, substantially as described.

4. The combination in a camera, of the telescoping sections forming the casing, one of the sections having a removable cap, or end plate, with the frame $C'$, pivotally secured in said sections near its end plate, the box or magazine $C^2$, pivotally secured in said frame and adapted to engage therewith, and a mechanism to raise the frame and box to a vertical position by the inward movement of the sections and to lower it to a horizontal position and to release one of the plate-holders, by the extension of the sections, substantially as described.

5. In a camera, the combination of the telescoping sections forming the casing, with a box fixed in one of said sections and having its rear end open, a removable plate or cap on the outer end of the other section, the frame $C'$, pivotally secured in said section near its end plate, the box or magazine pivoted in said frame and adapted to engage therewith, and a mechanism to raise the frame and box to a vertical position at the open end of the fixed box by the inward movement of the sections and to lower it to a horizontal position by the extension of the sections, substantially as described.

6. In a camera, the combination of the telescoping sections, forming the casing, with a box fixed in one of said sections and having its rear end open, a removable plate or cap on the outer end of the other section, the frame $C'$, pivotally secured in said section near its end plate, the box or magazine pivoted in said frame and adapted to engage therewith, and a mechanism to raise the frame and box to a vertical position at the open end of the fixed box by the inward movement of the sections and to lower it to a horizontal position and release one of the plate-holders, by the extension of the sections, substantially as described.

7. In a camera, the combination of the telescoping sections forming the casing, with a plate-carrier or magazine pivotally secured in one of the sections, a mechanism to raise the carrier or magazine to a vertical position by the inward movement of the sections and to lower it to a horizontal position by the extension of said sections, and a spring-actuated releaser secured on one end of the magazine and having a projection to enter the same and adapted to forwardly project and release one of the plate-holders, substantially as described.

8. The combination of the telescoping sections A, and B, forming the casing, with the box C, fixed in the section A, the removable cap or end plate $a'$ on the outer end of the section B, the frame $C'$, pivotally secured in the section B, the levers G, pivoted at one of their ends to said frame and likewise secured at their other ends within the section A, the box or magazine $C^2$, pivotally secured within the frame $C'$, and adapted to engage therewith, and having at one of its ends the lugs $c^7$, and in its other end the slots $c^4$, and arms $c^5$, the spring-actuated releaser E, having the projection $e'$, adapted to extend into the box $C^2$, substantially as described.

9. In a camera, the combination of a plate or partition, having an opening therein, with a shutter pivotally secured on said partition, and having arms or prongs extending through a slot in the casing and provided with an opening and adapted to close the opening in the partition, a hook on the surface of the shutter and a spring secured at its ends to the sides of the casing and provided at its middle with a depression to receive the hook on the shutter, substantially as described.

10. A magazine, comprising the box $C^2$, having at one of its ends the inwardly-projecting lugs $c^7$, and its other end provided with the slots $c^4$, and arms $c^5$, the springs $c^6$, the plate-holder D, having at one of its ends the lateral projections $d'$, to engage the projections $c^5$, and the spring-actuated releaser E, having the arm $e'$, to enter the box or magazine, substantially as described.

11. A magazine, comprising the box $C^2$, having at one of its ends the inwardly-projecting lugs $c^7$, the springs $c^6$, on the inner surface of its back, the slots $c^4$, and arms $c^5$, at the other end of the magazine for the reception and engagement of suitable projections on the plate-holders and means to release the plate-holders from the magazine or box, substantially as described.

ELLSWORTH E. FLORA.

Witnesses:
CHAS. C. TILLMAN,
E. A. DUGGAN.